H. W. BERTHOLF.
Straw Cutter.
No. 7,727.
2 Sheets—Sheet 1.
Patented Oct. 22, 1850.
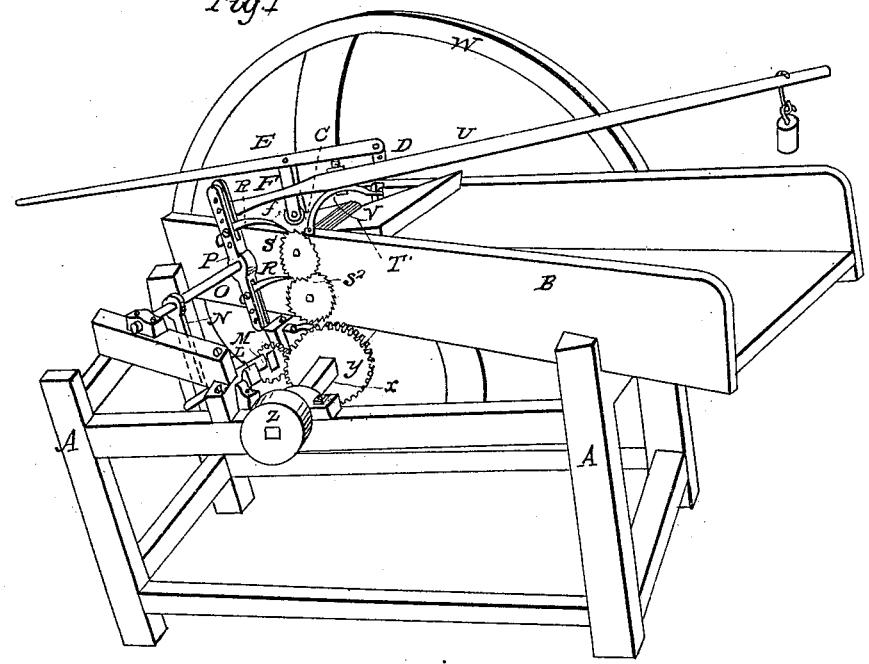
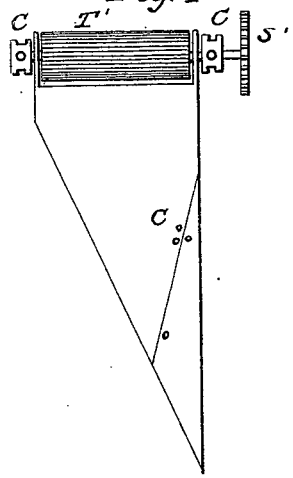

H. W. BERTHOLF.
Straw Cutter.
No. 7,727.
2 Sheets—Sheet 2.
Patented Oct. 22, 1850.
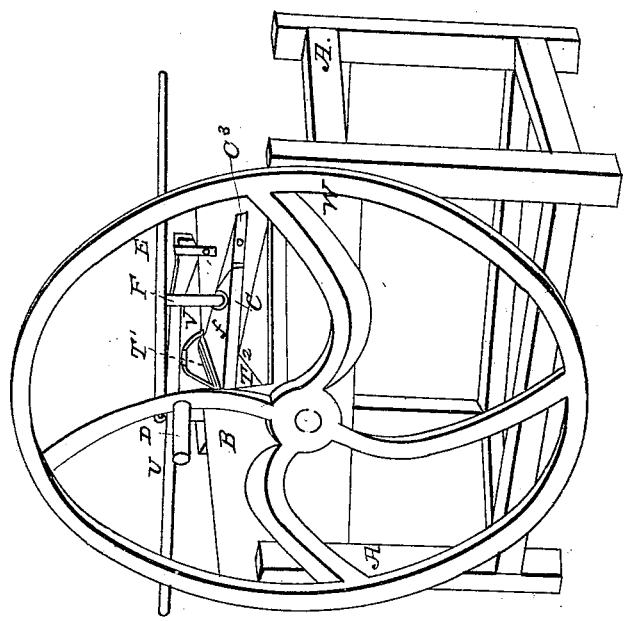
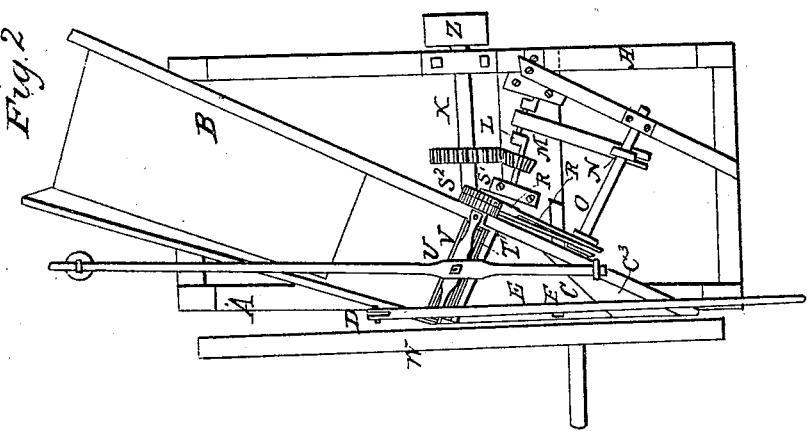

UNITED STATES PATENT OFFICE.

HENRY W. BERTHOLF, OF SUGAR LOAF, NEW YORK.

FEEDING APPARATUS FOR STRAW-CUTTERS.

Specification of Letters Patent No. 7,727, dated October 22, 1850.

*To all whom it may concern:*

Be it known that I, H. W. BERTHOLF, of Sugar Loaf, Orange county, State of New York, have invented a new and useful Improved Straw-Cutter; and I do hereby declare that the following is a full description of the same.

The nature of my invention consists in the arranging of the feed box, obliquely to the action of the cutters, so as to cut the straw or stalks lengthwise or nearly so. Also in arranging the mouth of it, so as to compress the straw or stalk, by means of a lever, weighted or operated by manual pressure, when the knives are in the act of cutting and thereby preventing it from slipping or drawing from under the edges of the knives. But to describe my improvement more particularly I will refer to the accompanying drawings; the same letters on the several drawings referring to the same parts wherever they occur.

Figure 1, a perspective view of the backside of the machine. Fig. 2, is a horizontal view. Fig. 3, a front view showing the mouth of the cutting box. Fig. 4, a view of the compresser as hinged to the feed roller.

Letter A, is the frame.

B, cutting box arranged diagonally on the frame of the machine so as to present the straw or stalk obliquely to the cutter.

C, is compressing lid or cap of the cutting box mouth having hinges (c, c), on its back edge for attaching or hinging to the journal of the upper feed roller.

D, is an upright standard attached to the cutting box B.

E, is the compressing lever having its fulcrum on the standard D; it carries a compressing arm F, provided at its lower end with a friction roller (f), bearing on the compressing lid C.

L, is a feed gear shaft having on it a small bevel toothed spur wheel for gearing into the main driving wheel and operating the feed rollers and compressing levers.

M, is a rod on feed gear shaft keyed at its opposite end to the lower end as an arm N, on the ratchet gear shaft.

O, is a shaft having attached to it the ratchet gear cranks P, P.

R, R, are clicks for giving motion to the feed rollers.

$S^1$, $S^2$, are feed ratchets.

$T^1$ $T^2$, are upper and lower feed rollers in the cutting box.

U, is a weighted lever extending across the machine and having a bracket V, on the under side of it for pressing on the ends of the upper feed roller.

W, is a fly wheel.

X, is a main shaft.

Y, is a driving cog wheel on main shaft.

Z, is a pulley.

The operation of these several parts are that when the straw or corn stalks, are to be cut they are placed in the trough or cutting box and forced between the feed rollers till a full feed is obtained. The machine is then ready for operation and on applying the power the feed rollers immediately begin to feed in. The end of the lever E, is then weighted or depressed by manual power and the arm F, causes the cap (c), of the mouth piece of the cutting box to compress the straw under it during the action of the knife and thereby preventing the straw from slipping under it.

When straw is to be cut it is not as material that it should be cut longitudinally as that of the heavier stalk of corn. To accommodiate this difference a portion of the compresser $C^3$, is taken out and a block put in the place of it thereby contracting the mouth of the cutting box and causing the straw to present itself to the knife at right angles or nearly so.

Having now described my invention and its operation I will proceed to state what I claim and desire to secure by Letters Patent.

What I claim therefore is:

The use and employment of the adjustable and compressing lid C, in combination with the feed roller and a cutting box having an adjustable block piece to contract the mouth of it and so arranged as to present the straw or stalk obliquely at different angles to the action of the knife and compress it while under its edge substantially in form and manner as herein set forth.

HENRY W. BERTHOLF.

Witnesses:
S. H. WALES,
EL. POLHAMUS.